(12) United States Patent
Cattaneo

(10) Patent No.: US 7,219,696 B2
(45) Date of Patent: May 22, 2007

(54) CARTRIDGE FOR ADJUSTING THE FLOW RATE AND MIXING OF WATER FLOWS IN FAUCETS IN GENERAL

(76) Inventor: Piero Cattaneo, Via Stazione, 21, 28010 Cavaglio D'Agogna (NO) (IT)

( * ) Notice: Subject to any disclaimer, the term of this patent is extended or adjusted under 35 U.S.C. 154(b) by 251 days.

(21) Appl. No.: 11/081,290

(22) Filed: Mar. 16, 2005

(65) Prior Publication Data

US 2006/0144449 A1 Jul. 6, 2006

(30) Foreign Application Priority Data

Dec. 30, 2004 (IT) .......................... MI2004A2559

(51) Int. Cl.
*F16K 11/078* (2006.01)
*F16K 31/00* (2006.01)
(52) U.S. Cl. .................... 137/625.4; 251/297
(58) Field of Classification Search .......... 137/625.17, 137/625.4, 625.41, 636.2, 636.3; 251/288, 251/297
See application file for complete search history.

(56) References Cited

U.S. PATENT DOCUMENTS

| | | | | | |
|---|---|---|---|---|---|
| 4,505,301 A | * | 3/1985 | Yang | ...................... | 137/625.41 |
| 4,708,172 A | * | 11/1987 | Riis | ........................ | 137/625.17 |
| 4,941,509 A | * | 7/1990 | Orlandi | .................. | 137/625.17 |
| 4,960,154 A | * | 10/1990 | Dagiantis | ............... | 137/625.17 |
| 5,082,023 A | * | 1/1992 | D'Alayer de Costemore d'Arc | ..... | 137/636.3 |
| 5,363,880 A | * | 11/1994 | Hsieh | ..................... | 137/625.17 |
| 5,386,852 A | * | 2/1995 | Bosio | ..................... | 137/625.17 |
| 5,522,429 A | * | 6/1996 | Bechte et al. | .......... | 137/625.17 |
| 5,592,971 A | * | 1/1997 | Knapp | ................... | 137/625.41 |
| 5,967,184 A | * | 10/1999 | Chang | ................... | 137/625.17 |
| 5,992,457 A | * | 11/1999 | Humpert et al. | ....... | 137/625.17 |
| 6,796,544 B1 | * | 9/2004 | Chen | .......................... | 251/205 |

* cited by examiner

*Primary Examiner*—John Rivell
(74) *Attorney, Agent, or Firm*—Hedman & Costigan; James V. Costigan

(57) ABSTRACT

The present invention relates to a cartridge for adjusting the flow rate and mixing of water flows in faucets in general, comprising a cartridge body therefrom a rod to which a drive knob is coupled projects.

The main feature of the invention is that the cartridge further comprises a reed spring coupled to the drive rod and operating between the drive or controlling knob and a rod supporting element.

On the rod supporting element are provided cam elements which cooperate with the spring reed for setting the pushing load detectable by the user as he/she operates the rod.

7 Claims, 5 Drawing Sheets

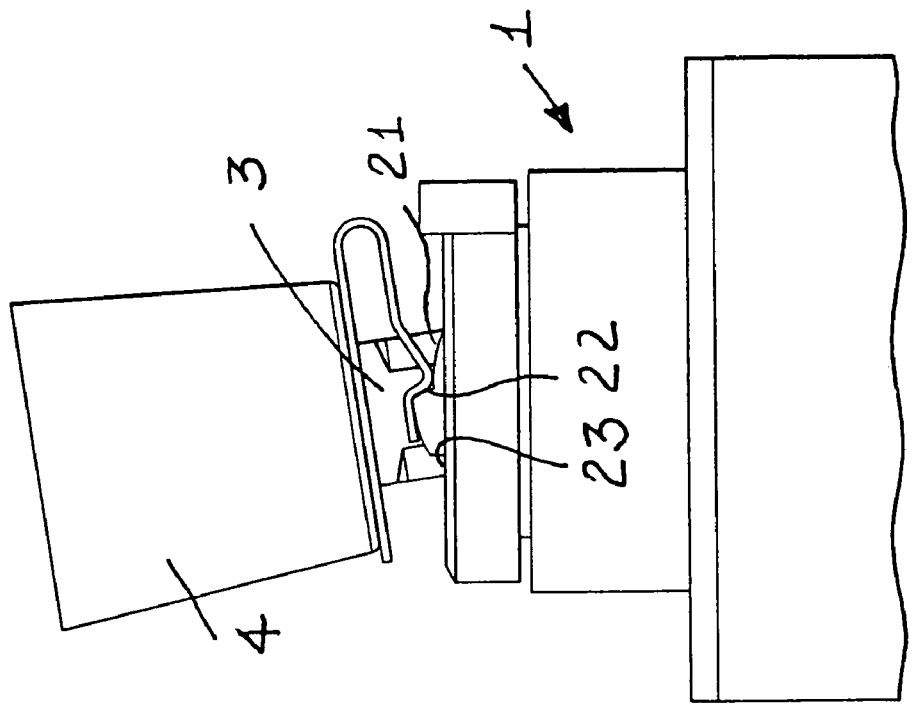
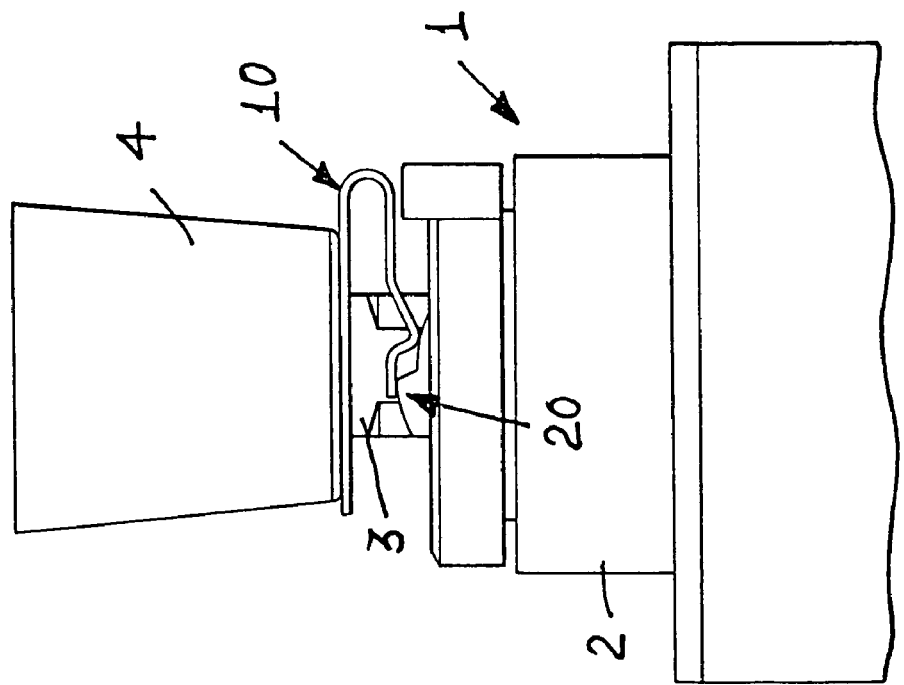

CARTRIDGE FOR ADJUSTING THE FLOW RATE AND MIXING OF WATER FLOWS IN FAUCETS IN GENERAL

BACKGROUND OF THE INVENTION

The present invention relates to a cartridge for adjusting the flow rate and mixing water flows in faucets in general.

As is known, single-drive cartridges, as conventionally used in faucets and the like, comprise a cartridge body therefrom a control or drive rod projects.

Said control rod is typically subjected to oscillations about a horizontal axis, in order to adjust the flow rate and oscillations about a vertical axis, to adjust the mixing of the two cold and hot water flows.

The cartridge of the above mentioned type, however, have the drawback that it is not possible to sense a proper faucet opening and closure and, moreover, a different operating resistance occurs as the water system pressure changes.

To solve the above mentioned problem, cartridge have been designed in which are provided resilient means operating under torsion to generate different operating forces, providing the user with a proper sensing of the driving or controlling operation being performed.

However, the above mentioned solutions have been found as very delicate, since a spring operating under torsion, is subjected to frequent fatigue failures.

SUMMARY OF THE INVENTION

Accordingly, the aim of the present invention is to solve the above mentioned problem, by providing an adjusting cartridge for adjusting the flow rate and mixing of water flows in faucets in general, allowing to adjust the water flow rate in a very accurate manner and independently from the water system pressure.

Within the scope of the above mentioned aim, a main object of the invention is to provide such an adjusting cartridge, which, owing to its specifically designed construction, allows to provide a water saving, and a long duration, flexible, efficient operating mechanism which can be easily adjusted and is very practical in use.

Another object of the present invention is to provide such an adjusting cartridge which is very reliable and safe in operation.

Yet another object of the present invention is to provide such an adjusting cartridge which can be easily made and which, moreover, is very competitive from a mere economic standpoint.

According to one aspect of the present invention, the above mentioned aim and objects, as well as yet other objects, which will become more apparent hereinafter, are achieved by a cartridge for adjusting the flow rate and mixing of water flows in faucets in general, comprising a cartridge body therefrom a control rod for coupling to a driving knob projects, characterized in that said cartridge comprises a reed spring coupled to said control rod and operating between said drive or control knob and a rod supporting element, said rod supporting element further supporting cam means interacting with said reed spring, to set the pushing load to be detected by a user as said user operates said control rod.

BRIEF DESCRIPTION OF THE DRAWINGS

Further characteristics and advantages of the present invention will become more apparent hereinafter from the following detailed disclosure of a preferred, though not exclusive, embodiment of an adjusting cartridge for adjusting the flow rate and mixing of water flows in faucets in general, which is illustrated, by way of an indicative, but not limitative, example in the accompanying drawings, where:

FIG. 5 illustrates the subject cartridge in a starting operation step thereof, in which it is fully closed;

FIG. 6 illustrates the adjusting cartridge in a plug-in step thereof; and

DESCRIPTION OF THE PREFERRED EMBODIMENTS

Figure 1:
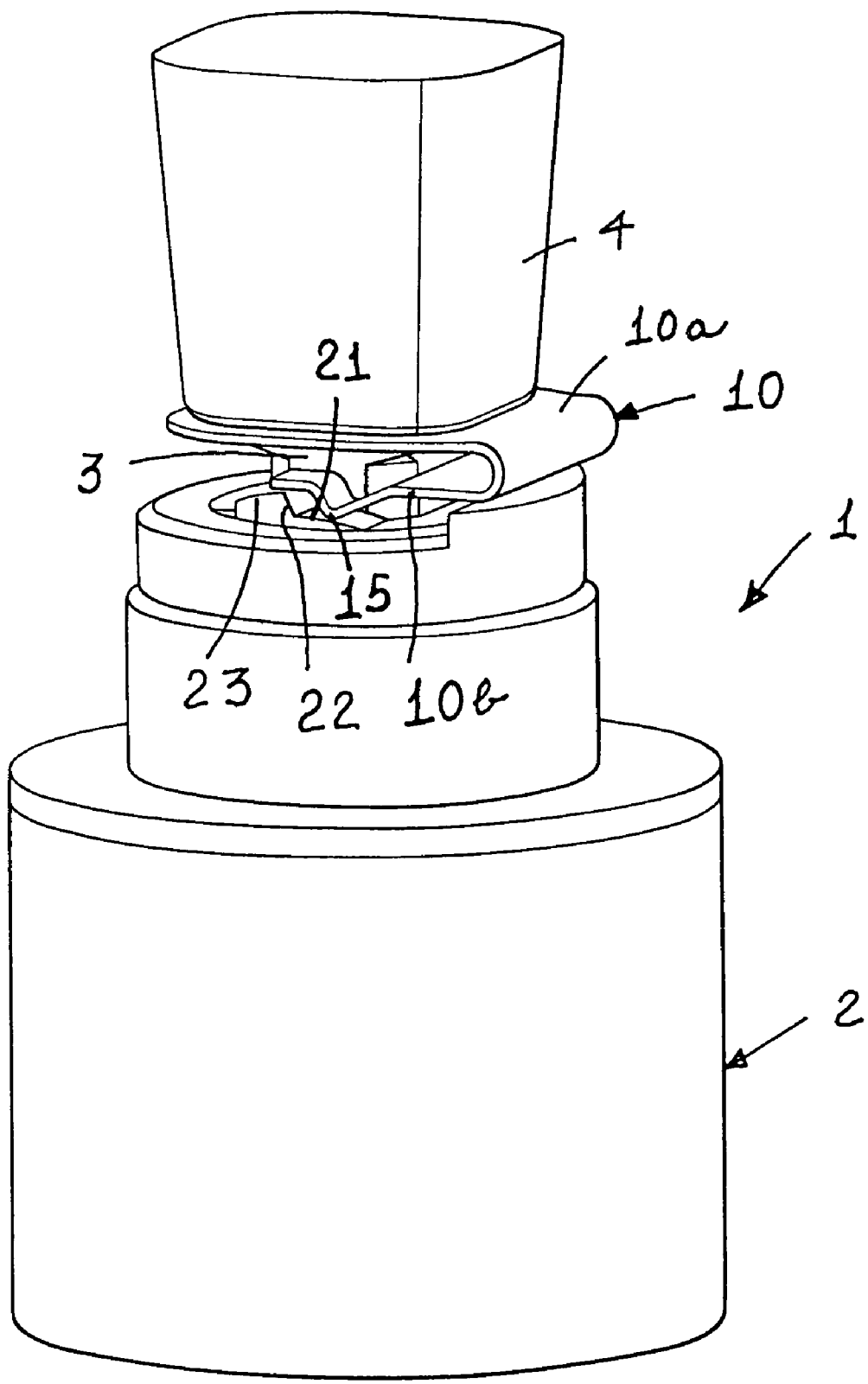
FIG. 1 is a perspective view illustrating the adjusting cartridge according to the invention.
Figure 2:
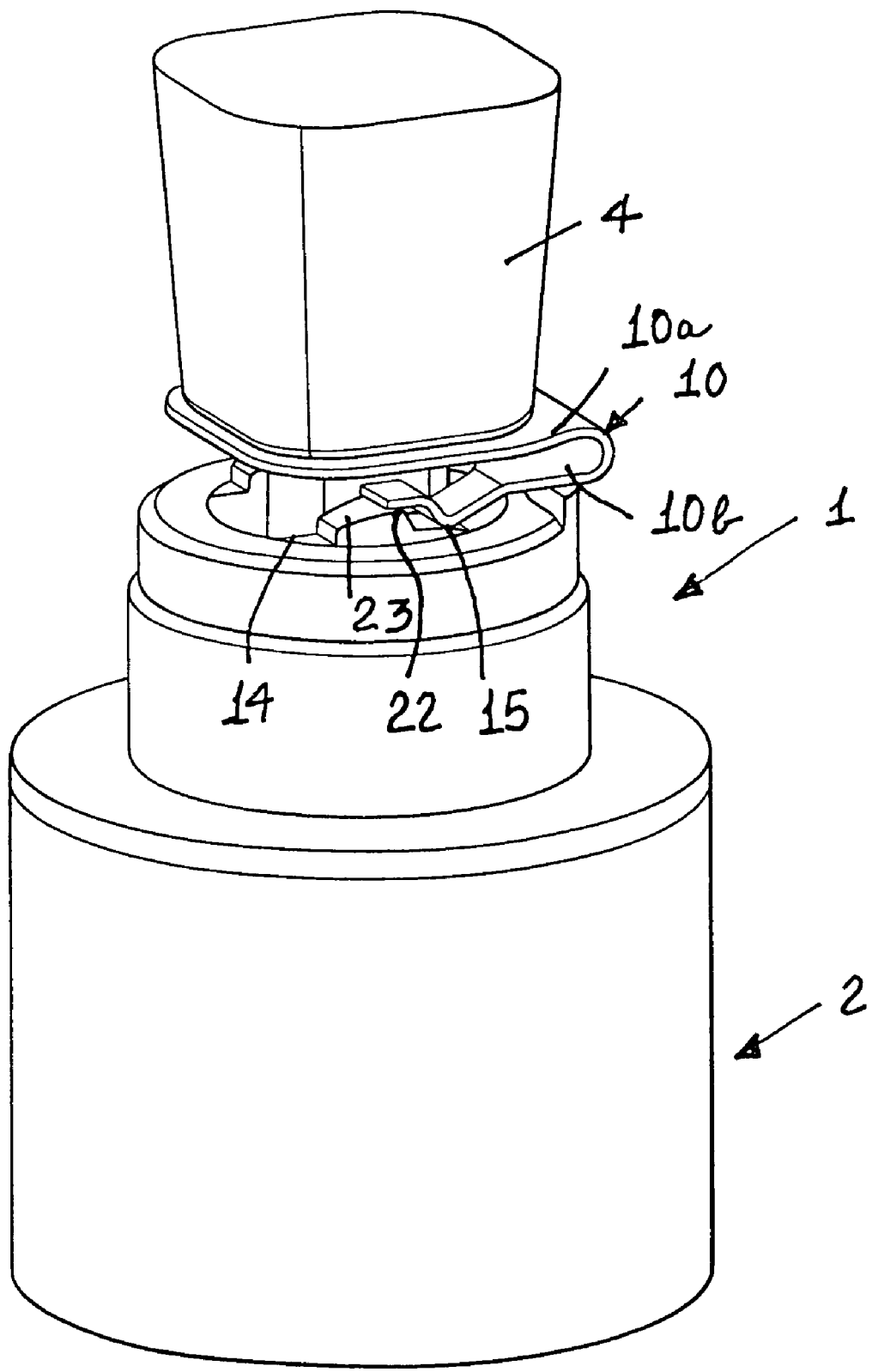
FIG. 2 is a further perspective view illustrating the cartridge as seen from another direction.
Figure 4:
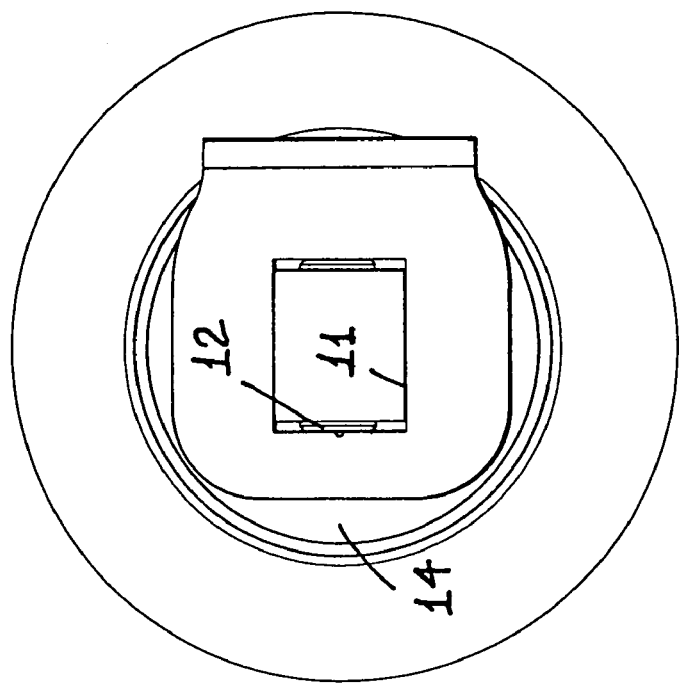
FIG. 4 is a top plan view illustrating the adjusting cartridge according to the invention.
Figure 3:
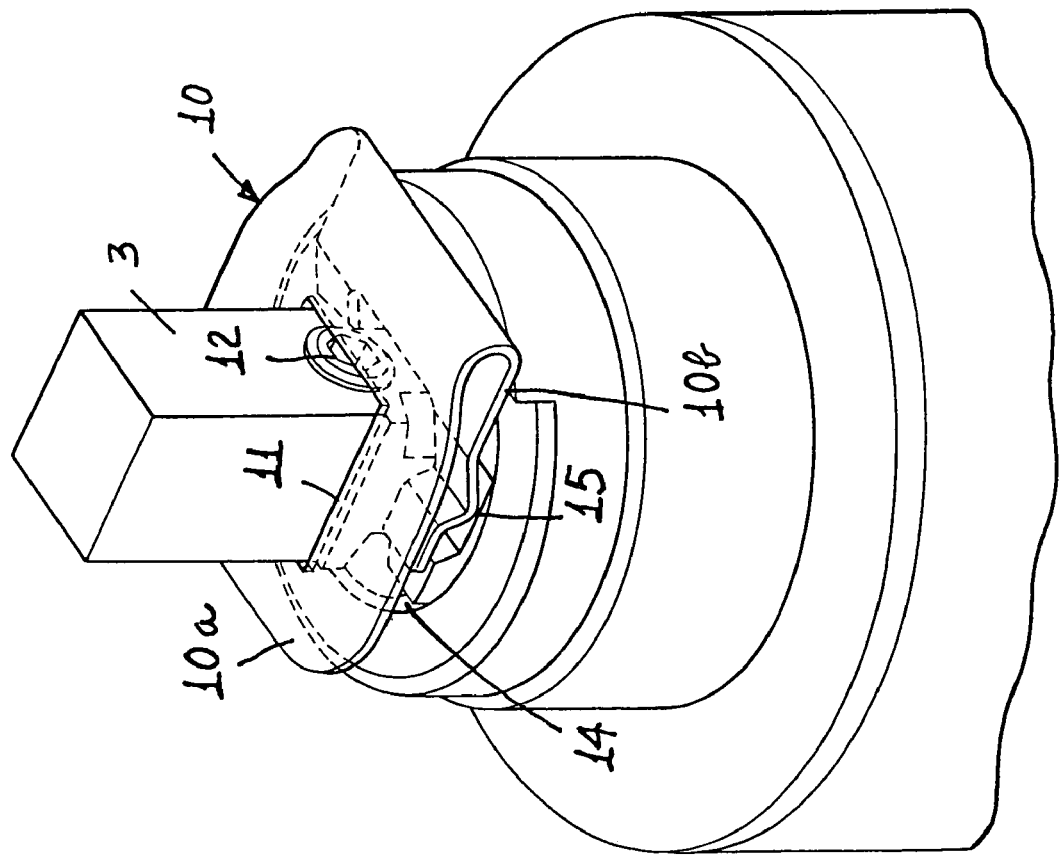
FIG. 3 is yet a further perspective view illustrating the cartridge with the control knob removed therefrom.
Figure 7:
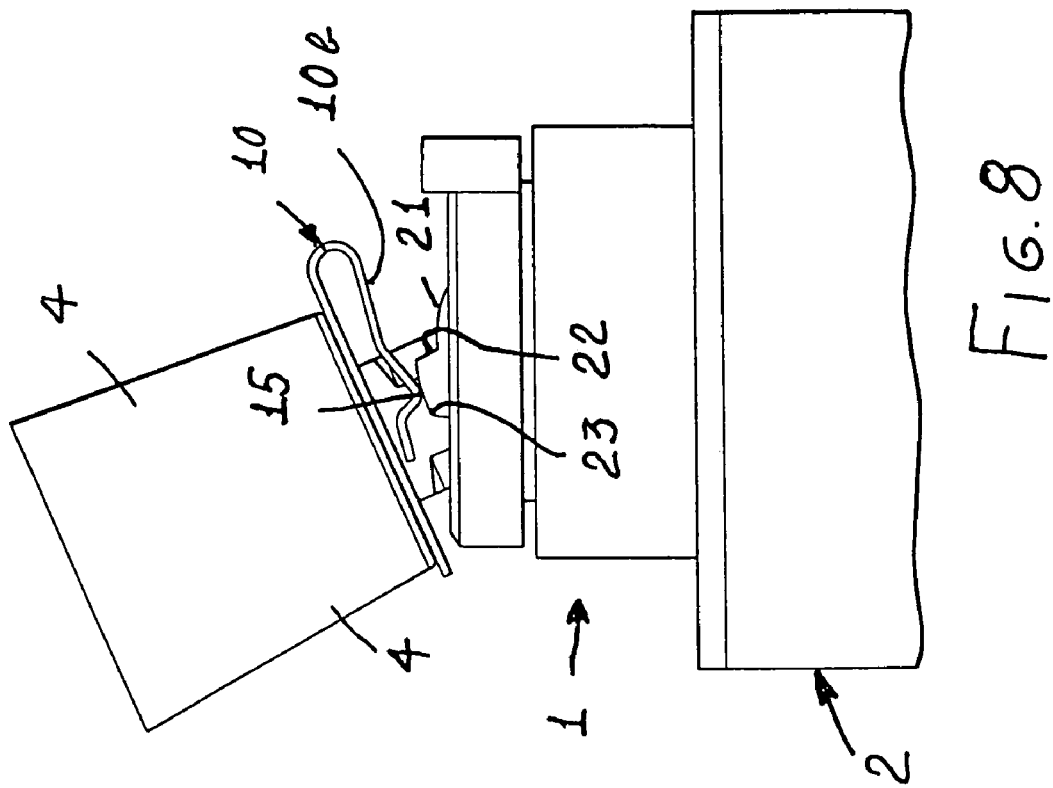
FIGS. 7 and 8 illustrate two different positions, in an after-plug in operating step.
Figure 8:
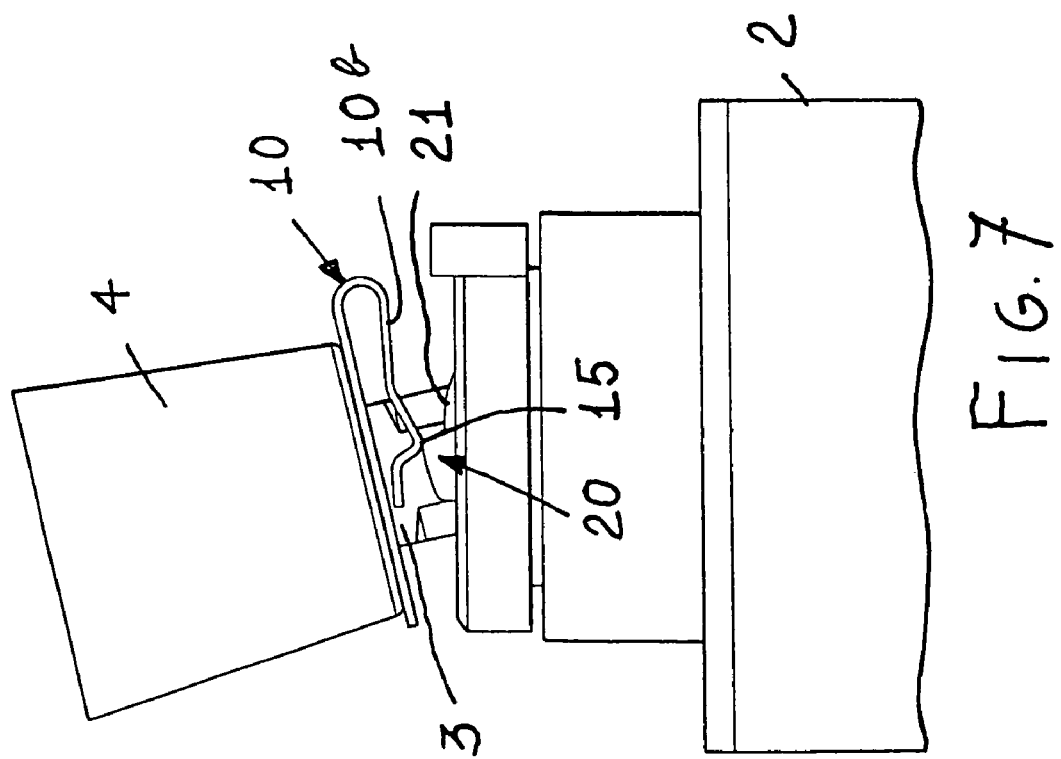

With reference to the number references of the above mentioned figures, the adjusting cartridge for adjusting the flow rate and mixing of water flows in faucets in general, according to the present invention, which has been generally indicated by the references number 1, comprises a cartridge body 2, therefrom a control or driving rod 3, to which is coupled a drive or control knob 4 of any desired shapes projects, the main feature of the invention is that the cartridge further comprises a reed or blade spring, generally indicated by the reference number 10, which is coupled to the control rod 3 and operates between the knob 4 and a support 14 provided for supporting the control rod 3, which is rotatably applied inside the body 2.

More specifically, the reed spring 10 comprises a top coupling arm 10a, in which a window 11 for coupling to said rod is provided.

Said window 11 can be designed so as to have the same shape as that of said control rod 3 or, optionally, as is shown in the drawings, it can have a larger size, thereby allowing the top portion of the reed to move and to change the position of said reed through a dowel 12 housed in the window 11.

At the top, the reed spring 10 comprises fork arms 10b adjoining the control rod 3 and having a recessed portion 15 operating as a driving element for abutment on the cam means, generally indicated by the reference number 20, defined by the supporting element 11.

The cam means 20 have a starting lead-in portion 21, thereat the displacement of the recessed portion 15 is performed without any remarkable load to be sensed by the operator up to the plug-in ramp 22, which practically provides an obstacle and form a "hard point" which can be overcome by a supplementary effort.

After the plug-in ramp 22, the cam means 20 define a driving portion 23, thereat the driving force is reduced to a minimum, since no load variations due to the spring releasing are made on the faucet lever.

The thus designed spring operates exclusively under flexure and accordingly it will have a comparatively long duration.

Moreover, the use of a larger size window 11 would allow to adjust the position of the reed spring through the adjusting dowel 12, thereby anticipating or delaying the abutment against the plug-in ramp 22.

The above disclosed construction has the advantage that it does not require efforts during the closure operation, which is performed in a very simple and easy manner.

The provision of the adjusting dowel and the displacement of the spring, allows to solve the problem of lacking of adjustment of the minimum necessary water amount, depending on the water system pressure and, accordingly, allows to always obtain a great water saving, independently from the supply conditions.

From the above disclosure it should be accordingly apparent that the invention fully achieves the intended aim and objects.

In particular, the fact is to be pointed out that the invention provides a cartridge for adjusting the flow rate and mixing of water flows in faucets in general, allowing to provide a very accurate adjusting, with a very small effort, owing to the provision of a substantially U shape resilient reed or blade.

The invention as disclosed is susceptible to several modifications and variations all of which will come within the scope of the invention.

Moreover, all the constructional details can be replaced by other technically equivalent elements.

In practicing the invention, the used materials, as well as the contingent size and shapes, can be any, depending on requirements.

The invention claimed is:

1. A cartridge for adjusting the flow rate and mixing of water flows in faucets in general, comprising a cartridge body therefrom a control rod for coupling to a driving knob projects, characterized in that said cartridge comprises a reed spring coupled to said control rod and operating between said drive or control knob and a rod supporting element, said rod supporting element further supporting cam means interacting with said reed spring, to set the pushing load to be detected by a user as said user operates said control rod.

2. A cartridge according to claim 1, characterized in that said reed spring comprises a substantial U shape.

3. A cartridge according to claim 1, characterized in that said reed spring has a top arm with a window for coupling to said control rod and a bottom arm of fork shape for engagement with said cam means.

4. A cartridge according to claim 3, characterized in that said window has a size larger than that of said control rod and that an adjusting dowel for adjusting a position of said reed spring with respect to said control rod and cam means is provided.

5. A cartridge according to claim 3, characterized in that said reed spring, at said fork arms, comprises a recessed portion adapted to contact said cam means.

6. A cartridge according to claim 1, characterized in that said cam means comprise a lead-in portion coupled, through a plug-in ramp, to a driving portion, of an indifferent equilibrium type.

7. A cartridge according to claim 1, characterized in that said cam means requires, in a closure operation thereof, a minimum effort.

* * * * *